United States Patent [19]  
Elmer et al.

[11] 4,159,363  
[45] Jun. 26, 1979

[54] COMPOSITIONS OR Br OR Cl CONTAINING POLYMERS AND POLYCARBODIIMIDES

[75] Inventors: Otto C. Elmer, Akron, Ohio; Balbhadra Das, Allison Park, Pa.

[73] Assignee: The General Tire & Rubber Company, Akron, Ohio

[21] Appl. No.: 897,987

[22] Filed: Apr. 20, 1978

[51] Int. Cl.$^2$ .......................... C08K 5/16; C08L 9/00; B32B 25/02; B32B 25/18
[52] U.S. Cl. .................................... 428/295; 152/359; 156/110 A; 156/110 C; 260/45.9 D; 428/474; 428/483; 428/512; 428/517; 428/520
[58] Field of Search ...................... 260/45.9 DI; 526/6; 152/359, 357 R; 156/110 A, 110 C; 428/474 I, 483, 512, 517, 520, 295, 495

[56] References Cited  
U.S. PATENT DOCUMENTS

| | | | |
|---|---|---|---|
| 2,654,680 | 10/1953 | Goppel et al. | 260/45.9 DI |
| 3,193,523 | 7/1965 | Neumann et al. | 260/45.9 DI |
| 3,297,795 | 1/1967 | Peter et al. | 260/45.9 DI |
| 3,776,882 | 12/1973 | Witzler et al. | 260/45.9 DI |
| 3,852,101 | 12/1974 | Batchelor | 260/45.9 DI |
| 4,009,325 | 2/1977 | Freedman et al. | 526/6 |

Primary Examiner—Harold Ansher

[57] ABSTRACT

The use of a minor amount by weight of a polycarbodiimide in an active Br or Cl containing polymer serves to lessen the adverse effects caused by formation of Br or Cl decomposition products on aging. In particular, the use of polycarbodiimides in bromo butyl or chloro butyl rubber tire inner liners, especially those also accelerated by polyimino compounds during curing, adjacent hydrocarbon rubber layers (carcass or ply stocks) reinforced with polyester cords serves to reduce the degradations or heat aging of the polyester cord caused by Br and/or Cl and/or amine compounds or fragments which may tend to migrate from the inner liner through the ply stock to the polyester cords.

12 Claims, No Drawings

COMPOSITIONS OF BR OR CL CONTAINING POLYMERS AND POLYCARBODIIMIDES

BACKGROUND OF THE INVENTION

Polyester cords such as polyethylene terephthalate cords are used in automobile tires for the reinforcement of carcass plies. While the cord has outstanding properties as to strength and low flat-spotting tendencies, it is relatively easily degraded by chemical means. Acids and bases are known catalysts for polyester hydrolytic degradation. During normal operation of a tire having polyester cords, it was found that the cords lost strength. The elimination of amine liberating chemicals from the rubber curing system was beneficial and lowered the rate of hydrolytic degradation.

However, in tubeless tires there is an inner liner adjacent to the carcass plies of the tire, and it is made of a composition including bromobutyl rubber and/or chlorobutyl rubber because of the ability of this rubber to retain gases (low rate of diffusion) and good adhesion to other rubbers. However, for most purposes in order to obtain superior adhesion to the carcass plies which are of high unsaturated rubbers and to obtain other rubbery properties, these halogenated butyl rubbers are blended with a substantial proportion of highly unsaturated rubber(s) such as natural rubber, SBR, etc. In curing a tire the different rubber compounds in the tread, plies or carcass layers, belts, sidewalls, interliners, beads and so forth are formulated so as to cure together properly to form a unitary or composite structure. In many cases the halobutyl rubber innerliner composition requires an amine accelerator such as a polyimino compound like di-o-tolyl guanidine which is a relatively strong base to properly cure the halobutyl inner liner compounds or compositions to the tire assembly. Only a thin layer of the polyester skim or ply stock separates the polyester tire cords from the halobutyl rubber inner liner. Br or Cl butyl rubbers are known to degrade at elevated temperatures to give Br and/or Cl or acid fragments. Also, the polyimino accelerator may give off amine fragments. These acid and amine compounds and/or their fragments can diffuse through the innerliner and through the ply or skim rubber stock to attack the polyester cord.

Accordingly, it is one object of this invention to provide a Br and/or Cl butyl rubber composition suitable for preparing an inner liner for a tire and which exhibits reduced attack on polyester cords or polyester reinforcing elements.

Another object of this invention is to provide a flexible laminate comprising a Br or Cl butyl rubber composition and a hydrocarbon rubber composition adjacent thereto and containing a plurality of polyester cords adhesively bonded thereto and which exhibit reduced loss in strength on aging, both layers preferably being sulfur cured with sulfur cure systems sufficient to cure said polymers of the compositions of said layers.

These and other objects and advantages of the present invention will become more apparent to those skilled in the art from the following detailed description and working examples.

DISCUSSION OF THE PRIOR ART

Carbodiimides are known to react with organic and inorganic acids to give substituted ureas. They are reported to protect polyesters from degradation by reacting supposedly with free carboxyl groups and retarding their autocatalytic activity.

U.S. Pat. No. 3,296,190 (1967) is directed to the stabilization of polyesters against hydrolysis by mixing with the same a silicon compound which can contain active hydrogen atoms and a carbodiimide including polycarbodiimides. The carbodiimide may contain a—NCO group. The effect with the additive mixture is allegedly better than with either additive alone. The esters include those obtained from acids and alcohols, polyesterurethanes, polyesteramides, natural esters and other ester containing compounds such as fluorinated acrylic esters and their copolymers. British Patent No. 1,269,216 (1972) discloses an article containing a polyethylene terephthalate cord embedded in a curable rubber composition containing a carbodiimide such as a polycarbodiimide. Reduced loss in strength on heat aging is shown by the use of the polycarbodiimides. Rubbers used in the composition specifically mentioned are butyl rubber, natural rubber, SBR and synthetic rubbers of low ash content. The carbodiimide is supposed to protect against the small amounts of moisture normally present in the rubber composition and textiles.

SUMMARY OF THE INVENTION

According to the present invention it has been discovered that the use of from about 1.5 to 25, preferably from about 2 to 12, parts by weight of a polycarbodiimide per 100 parts by weight of Br and/or Cl containing polymer will serve to reduce the adverse affects caused by Br or Cl containing products on heating and heat aging. In particular, it has been discovered that the use of polycarbodiimides in bromo or chloro butyl rubber tire inner liner compositions, especially those also containing polyimino accelerators for use during curing, adjacent hydrocarbon rubber layers (carcass, ply or skim stocks) reinforced with polyester cords serves to reduce the degradation on heating or heat aging of the polyester cord caused by halogen or halogen and amine compounds or fragments thereof which may tend to migrate from the inner liner through the ply stock to attack the polyester cords. The heat occurs during curing or forming, and in a tire in operation it is caused by repeated flexing of the tire when running, known as heat build-up. Heat effects, also, can occur just because of repeated changes in ambient temperatures and by processing methods such as calendering.

Also, the Br or Cl butyl rubber preferably contains a substantial amount of a highly unsaturated rubber to improve adhesion and other physical properties of the halobutyl rubber compound.

While the present invention is particularly directed to improvements in Br and/or Cl butyl rubber compositions for tire inner liners, it will be appreciated that a minor stabilizing amount of the polycarbodiimide can be used with any other active Br and/or Cl containing polymer such as polyvinyl chloride, polyvinylidene chloride, chlorinated rubber, chlorosulfonated polyethylene, polyepichlorohydrins, and so forth where said halogen polymer contains a polyester, is calendered onto a polyester fabric substrate, or is laminated and fused to a polymeric substrate containing a filler or reinforcing fiber or cord of a polyester. By active Br or Cl containing polymer is meant a polymer which loses its Br or Cl (as well as radicals or compounds thereof) on aging, heating, UV radiation and so forth. These other active Br or Cl containing polymers are well known for use in making coated fabrics, hose, belts, packing, fiber binders, and so forth.

DISCUSSION OF DETAILS AND PREFERRED EMBODIMENTS

Butyl rubber and halogenated butyl rubber such as chloro and/or bromo butyl rubber are well known. Butyl rubber may be made by reacting isobutylene and a small amount (about) 1.5 to 4.5% of isoprene in methyl chloride using aluminum chloride at a temperature of about −101° C. The resulting butyl rubber has about 0.5 to 3 mole % unsaturation. The butyl rubber can then be brominated and/or chlorinated using molecular bromine or chlorine or a compound which liberates these halogens for reaction with the butyl rubber. These halogenated butyl rubbers usually contain up to about 3% by weight of bromine and/or chlorine. The halogenated butyl rubbers, singly or in admixture, may be mixed with natural and synthetic rubbers and blends thereof such as natural rubber, rubbery polyisoprene, rubbery butadiene-styrene copolymers, and so forth and mixtures thereof. It is known that the rate of vulcanization is faster with halogenated butyl rubber than butyl rubber itself and that a halogenated butyl rubber such as bromo butyl rubber does not reduce tensile strength as much as butyl rubber in blends with natural rubber. For more information on bromobutyl rubber and chlorobutyl rubber, their preparation, blends with other rubbers, curing systems and uses, attention is invited to U.S. Pat. Nos. 2,631,984; 2,698,041; 2,732,354; 2,944,578; 2,992,670; "Synthetic Rubber," Whitby et al, John Wiley & Sons, Inc., New York, 1954, pages 838 to 891; "Polysar Butyl Handbook," Rooney, Polymer Corp., Limited, Sarnia, Canada, 1966, pages 12 to 19; and "Encyclopedia of Polymer Science and Technology," Interscience Publishers a division of John Wiley & Sons, Inc., New York, Vol. 2, 1965, page 754 et seq., in particular pages 762–763, 771–772, 776–777, 780, 782, 785, and 793–795, Vol. 3, 1965, pages 670–672 and Vol. 7, 1967, pages 828–829.

In order to improve the adhesion of the Br or Cl butyl rubber to the tire inner carcass layer the halobutyl rubber is blended with a highly unsaturated rubber such as natural rubber, cis polyisoprene, rubbery butadiene-1,3/styrene copolymers and the like and mixtures of such highly unsaturated hydrocarbon rubbers. The ratio of the halobutyl rubber to the highly unsaturated rubber is from about 100:15 to 100:110 parts by weight. The halobutyl rubber blend is mixed in a "Banbury" or on a rubber mill with the usual compounding and curing agents (preferably a sulfur curing system is used) known for use in compounding and curing halobutyl compositions in the usual amounts to cure the polymer(s) such as carbon black, zinc oxide, alkyl phenol disulfides, dithiocarbamates, zinc stearate, stearic acid, magnesium oxide, petroleum oils, sulfur, sulfur donors, benzothiazyl disulfide, lead dimethyldithiocarbamate, reclaimed rubber, clay, p,p'-dibenzoylquinone dioxime, wax, silica, tetramethyl thiuram monosulfide, sulfur, 2,2'-benzothiazyl disulfide, phenolformaldehyde resins, mixture of zinc sulfide and barium sulfate, calcium carbonate, melamineformaldehyde resin, calcined aluminum silicate, calcium metasilicate, aluminum stearate and so forth.

Polyimino compounds, preferably diimino compounds, are known as accelerators for use in curing systems for rubber and particularly halogenated butyl rubber compositions such as those containing natural or butadiene-styrene rubbery copolymers. They are used in minor amounts sufficient to speed up or accelerate vulcanization usually about 0.75 to 3.25 phr, and greater amounts, and may be used as the only accelerator. Examples of such polyimino compounds are di-o-tolyl guanidine, diphenyl guanidine, diphenyl guanidine phthalate sulfur containing guanidines, di-o-tolyl guanidine salt of dicatechol borate, condensation products of aniline and butyraldehyde, condensation products of formaldehyde and paratoluidine, 2-mercaptoimidazole and ethylene thiourea. See U.S. Pat. No. 2,933,117 and "Encyclopedia of Polymer Science and Technology," Interscience Publishers a division of John Wiley & Sons, Inc., New York, 1970, Vol. 12, pages 256 to 266.

Polycarbodiimides are known compounds. They can be made by reacting a polyisocyanate such as a diisocyanate in the presence of a suitable catalyst such as a phospholine, phospholine oxide, phospholine sulfide, phospholidine, phospholidine oxide and phospholidine sulfide. Another way to make these polycarbodiimides is to react an arylene diisocyanates having NCO groups of unequal reactivity with a stoichiometric deficiency of a primary or secondary alcohol to convert less than all of the isocyanate groups to urethane groups and then using a carbodiimide catalyst to convert the partially terminated diisocyanate to a urethane terminated polycarbodiimide. For more information on polycarbodiimides and their uses see U.S. Pat. Nos. 2,663,737; 2,663,738; 2,663,739; 2,941,966; 2,941,983; 3,502,722; 3,657,161; 3,671,478; 4,071,503 and 4,076,945; Defensive Publication No. 748,659 (May 6, 1969, 862 O.G. 23); and "Encyclopedia of Polymer Science and Technology," Interscience Publishers a division of John Wiley & Sons, Inc., New York, Vol. 7, 1967, pages 751 to 754. They, also, are known commercially as "Antioxidant PCD" polycarbodiimide (Farbenfabriken Bayer AG) and "Stabaxol" P polycarbodiimide (Mobay Chemical Corp., 14% minimum carbodiimide content).

The polyester reinforcing elements comprise fibers, continuous filaments, staple, tow, yarns, cords, fabric and the like, particularly cords for use in building the carcasses (and belts if used) of tires such as passenger and truck tires, and are linear high molecular weight polyesters usually made by the condensation of $\alpha,\omega$-glycols and dicarboxylic acids. These polyester fibers and the like may be oriented and can have number average molecular weights up to about 60,000 and melting points of up to about 300° C. Preferably, these polyesters exhibit substantial crystallinity, up to as much as about 50%, usually 38–45%, high strength and high tenacity. Also, preferred, are the polyesters in which the fiber is composed of at least 80% by weight of an ester of a dihydric alcohol and terephthalic acid such as poly(ethylene terephthalate). Examples of such polyesters are the high molecular weight polymers obtained from polyethylene glycols and the aromatic dicarboxylic acids, e.g., the high molecular weight condensation product obtained from ethylene glycol and terephthalic acid known as polyethylene terephthalate. Other polyesters which may be used are poly(ethylene oxybenzoate); polypivalalactone; terpolymers from dimethyl phthalate, dimethyl isophthalate and ethylene glycol; polyesters having at least two different repeating units from ethylene terephthalate, p-tri-methylene oxybenzoate, and ethylene-1,4-diphenoxy butane-4,4'-dicarboxylate; poly(ethylene terephthalate-isophthalate); poly(1,4-cyclohexylenedimethylene terephthalate); and the like and mixtures thereof. Suitable polyester reinforcing elements are commercially available under the trademarks "Dacron" (du Pont), "Encron" (American Enka Corporation) and "Vycron" (Beaunit Corporation). These high molecular weight linear polyesters are well known and can be made by methods known to the art. For example, the preparation of polyesters is shown by U.S. Pat. Nos. 2,465,319; 2,965,613 and 2,901,466. Detailed discussion of polyesters such as polyester cords and fabrics useful for making filaments, fibers, cords and other various products are shown by:

(A) "Encyclopedia of Polymer Science and Technology," Volume 11, 1969, Interscience Publishers a division of John Wiley & Sons, Inc., New York, pages 1–41;

(B) "Encyclopedia of Chemical Technology," Kirk-Othmer, Second Edition, Volume 16, 1968, Interscience Publishers a division of John Wiley & Sons, Inc., New York, pages 143 to 159; and (C) "Polyesters," Korshak et al, 1965, Pergamon Press Inc., New York, N.Y., pages 384 to 415. The polyester reinforcing elements can readily be bonded or adhered to curable rubbery compounds (ply, carcass or skim stocks) by dipping the elements in a dip of 10–30% solids comprising an aqueous alkaline dispersion of a minor amount by weight of a mixture of a major amount by weight of a rubbery vinyl pyridine copolymer and a minor amount by weight of a phenolic composition of a resorcinol-formaldehyde resin and of a heat reactable 2,6-bis(2,4-dihydroxy phenylmethyl)-4-chlorophenol composition, drying the same, and combining said dipped and dried element with the vulcanizable rubber compound and vulcanizing the same.

Of course, in practice the halogenated butyl interliner composition, ply stocks (polyester cords embedded in the ply or skim stock), belts if any, treads, sidewalls and beads are all assembled properly and cured in a mold under heat and pressure at one time to form a composite structure such as a tire.

The rubber latex preferably used in the tire cord dip bath is a latex of a copolymer of a vinyl pyridine and a conjugated diolefin having 4 to 6 carbon atoms. The rubber latex is of the type described in U.S. Pat. No. 2,561,215 and comprises an aqueous alkaline dispersion of a copolymer of 50 to 95 percent by weight of a conjugated diolefin having 4 to 6 carbon atoms, 5 to 40 percent of a vinyl pyridine and 0 to 40 percent of a styrene. Examples of suitable vinyl pyridines are 2-vinyl pyridine, 4-vinyl pyridine, 2-methyl-5-vinyl pyridine, and 5-ethyl-2-vinyl pyridine.

It is usually preferred to use a latex of a copolymer of from about 60 to 80% by weight of butadiene-1,3, 7 to 22% by weight styrene and 7 to 22% by weight of 2-vinyl pyridine. Excellent results are obtained using a latex of a terpolymer of about 70% of butadiene-1,3, 15% of styrene and 15% of 2-vinyl pyridine, by weight, having a total solids content of around 30 to 50 percent. Further disclosures of rubbery vinyl pyridine copolymer latices may be found in U.S. Pat. Nos. 2,615,826 and 3,437,122.

The resin mixture used with the latex in the cord dip comprises an alkaline dispersion of resorcinolformaldehyde resin and the chlorophenolic compound. More information on how to prepare the heat reactable 2,6-bis (2,4-dihydroxy phenyl methyl)-4-chlorophenol composition is shown by Mather, "Development of a Polyester-Rubber Adhesive," British Polymer Journal, Volume 3, March, 1971, pages 58 to 62. See, also, "Mechanics of Pneumatic Tires," Clark, National Bureau of Standards Monograph 122, Washington, 1971, page 290.

For information on methods of adhering polyester cords to rubber see U.S. Pat. Nos. 3,660,202; 3,947,394; 3,962,518 and 3,968,304.

In order to apply the adhesive dip to the polyester cords in a reliable manner, the cords are fed through the adhesive dip bath containing the rubber and the phenolic resins and into a drying oven where they are dried. Also, as the cords leave the oven they enter a cooling zone where they are air cooled. In each case the adhesive-coated cords leaving the dip are dried in the oven at from about 300° to 500° F., or at a temperature below the temperature at which the polyester of the cord would lose its tensile strength, for from about 30–150 seconds. The time the cord remains in the dip is about a second or so or at least for a period of time sufficient to allow wetting of the cord and penetration of the fibers of the cord by the adhesive mixture.

Polyester fibers, yarns, filaments, cords or fabric and the like coated with the adhesive can have from about 3 to 7% by weight (dry) total solids from the adhesive dip on the cord based on the weight of the cord.

While the adhesive containing polyester reinforcing elements can be adhered to a vulcanizable blend of natural rubber, polybutadiene rubber, and rubbery butadiene-styrene copolymer by curing the same in combination together, it is apparent that said adhesive containing polyester reinforcing element can be adhered to other vulcanizable rubbery materials, by curing or vulcanizing the same in combination with the rubber, such as one or more of the foregoing rubbers as well as nitrile rubbers, polyisoprenes, vinyl pyridine rubbers, acrylic rubbers, and the like and mixtures of the same. These rubbers prior to curing can be mixed with the usual compounding ingredients including sulfur, stearic acid, zinc oxide, magnesium oxide, accelerators, antioxidants, antiozonants and other curatives and the like well known to those skilled in the art for the particular rubbers being employed.

The composition of the present invention can be used in the manufacture of radial, bias or belted-bias passenger car tires, truck tires, motorcycle and bicycle tires, tubes, hose, gaskets and wherever a halogenated butyl composition is employed in conjunction with polyester cord reinforcing elements such as those embedded in adjacent vulcanizable rubber layers, for example, where the halogenated butyl composition is used as the interliner or side wall in a polyester cord reinforced pneumatic tire.

The following examples will serve to illustrate the present invention with more particularity to those skilled in the art. All parts are parts by weight unless otherwise shown.

EXAMPLE 1

A high molecular weight polycarbodiimide was made according to the teaching of U.S. Pat. No. 4,076,945. A mixture of 1200 ml. of benzene, 348 g. of 80/20 2,4/2,6 tolylene diisocyanate and 8 g. of methanol were heated for 2 hours while the temperature went from 22° to 55° C. Then there was added to the mixture a catalytic amount of a carbodiimide catalyst, 3-methyl-1-phenyl-1-phosphe-3-cyclopentane-1-oxide, and the mixture was stirred and heated for about 36.5 hours. The temperature went from 32° to 76° C. At the end of the reaction 32 g. of micron size silica ("Syloid" 244, W.

R. Grace & Co. Davison Chem. Div.) were added. The mixture was then poured into trays to evaporate the solvent and then put in a vacuum oven. The polycarbodiimide was analyzed and found to contain 24.72% —N=C=—. This material was called Run I.

The method of this run was the same as that described above except that a different catalyst, 1-phenyl-3-methyl-3-phospholine-1-oxide, was used. The total overall reaction time was about 14½ hours. The product was analyzed and found to contain 25.06%—N=C=N—. This material was called Run II.

The materials of Runs I and II were combined and mixed with 5% of "Syloid" 978, W. R. Grace & Co., finely divided silica, and powdered to make for better dispersion. This material was designated as polycarbodiimide III.

EXAMPLE 2

"Dacron" 1300/3, polyethylene terephthalate, cord was passed through an aqueous cord dip and dried to provide a heat-set adhesive containing cord suitable for bonding to a vulcanizable rubber (skim or ply) compound on curing. The process of dipping and drying was as generally described above. The adhesive dip was made according to the procedure which follows. 16.6 parts of resorcinol were reacted with 14.7 parts of 37% aqueous formaldehyde solution in the presence of 1.3 parts of NaOH in admixture with 333.4 parts of water. The resulting resorcinol-formaldehyde, R-F, resin solution was then mixed with 244 parts of a 41% solids aqueous emulsion of a 70 butadiene-1,3/15 styrene/15 2-vinyl pyridine terpolymer to form a RFL dispersion. To the RFL dispersion there were then added 125 parts of a 3N ammonium hydroxide aqueous solution of 20% solids of a 2,6-bis(2,4-dihydroxy phenylmethyl)-4-chlorophenol composition. The final dip had a pH of about 10.

EXAMPLE 3

The following ingredients were mixed together.

TABLE 1

| Ingredient | Parts By Weight | | | | | |
|---|---|---|---|---|---|---|
| Rubber Compound | A | B | C | D | E | F |
| Natural Rubber (1) | 35 | 35 | 35 | 46.64 | 46.64 | 46.64 |
| Polybutadiene (2) | — | — | — | 15. | 15. | 15. |
| Bdn-Sty Copol. (3) | — | — | — | 52.9 | 52.9 | 52.9 |
| Chlorobutyl (4) | 50 | 50 | 50 | — | — | — |
| Bdn-Sty Copol. (5) | 15 | 15 | 15 | — | — | — |
| Carbon Black (6) | 20 | 20 | 20 | — | — | — |
| Carbon Black (7) | 60 | 60 | 60 | — | — | — |
| Carbon Black (8) | — | — | — | 33 | 33 | 33 |
| Carbon Black (9) | — | — | — | 33 | 33 | 33 |
| Petroleum oil (10) | 7.5 | 7.5 | 7.5 | 12.5 | 12.5 | 12.5 |
| Resin (11) | 2 | 2 | 2 | — | — | — |
| Resin (12) | — | — | — | 6.5 | 6.5 | 6.5 |
| Zinc Oxide | 5 | 5 | 5 | 3.8 | 3.8 | 3.8 |
| Stearic Acid | 2 | 2 | 2 | 1.5 | 1.5 | 1.5 |
| Antioxidant (13) | — | — | — | 1.2 | 1.2 | 1.2 |
| Di-o-tolyl guanidine (DOTG) | 1.5 | 1.5 | 1.5 | — | — | — |
| 2,2'-benzothiazyl disulfide | — | — | — | 1.7 | 1.1 | 1.1 |
| Tetramethyl Thiuram Monosulfide | — | — | — | 0.1 | 0.1 | 0.1 |
| Insoluble sulfur (14) | — | — | — | 3. | 3. | 3. |
| Sulfur | 1 | 1 | 1 | — | — | — |
| Polycarbodiimide III, Example 1, above | — | 2 | — | — | 2 | — |
| Polycarbodiimide (15) | — | — | 2 | — | — | 2 |

Samples of greige "Dacron" 1300/3 cord and the same cord dipped and dried as set forth in Example 2, above, were molded into rubber coupons 3"×½"×7/16" (4 cords per coupon) using the above rubber compositions A to F and cured. The cured test specimens were aged at 300° F. in a tightly closed jar for from 3 to 7 days. Then the cords were removed from the cured rubber by the customary swelling procedure and tested as to tensile properties according to ASTM D 2970. Controls without the rubber compound, also, were tested. The results are shown in the Tables below:

TABLE IA

| | Residual Tensile Strength of Greige Cord | | | | | | |
|---|---|---|---|---|---|---|---|
| Rubber Compound | 0 | A | B | C | D | E | F |
| Residual Tensile after molding, % | — | 95 | 96 | 93 | 94 | 98 | 95 |
| 3 days/300° F.* | 100 | 78 | 88 | 89 | 90 | 94 | 95 |
| 7 days/300° F.* | 96 | 73 | 64 | 71 | 86 | 69 | 75 |

*Calculated from the molded coupon tensile as 100%.

With greige cord the effect of the polycarbodiimide is not clear. While the protective action shows up during the 3 day aging, the effect after 7 days is confusing.

TABLE IB

| | Residual Tensile Strength of Adhesive Dipped and Dried Cord | | | | | | |
|---|---|---|---|---|---|---|---|
| Rubber Compound | O | A | B | C | D | E | F |
| Residual Tensile after molding, % | — | 100 | 98 | 103 | Ψ | 106 | 104 |
| 3 days/300° F.* | 97 | 56 | 79 | 80 | 95 | 95 | 96 |
| 7 days/300° F.* | 96 | 51 | 57 | 62 | 85 | 81 | 84 |

*Calculated from the molded coupon tensile as 100%.

Original tensile of the dipped cord is about 87% of the greige cord strength. After being molded into the rubber, dipped cord showed a slight (3–5%) tensile increase (compounds C–F). Tensile loss in the compounds containing chlorobutyl rubber was quite dramatic. Tensile values in the unprotected compound dropped to 34.1 lbs after 3 days at 300° F. aging. The presence of carbodiimides showed a most dramatic effect in the 3 day aging period, where the tensile loss dropped from 44% (compound A) to 20% (compounds B and C). The compound containing only hydrocarbon rubbers did not degrade the PET treated cord severely, and there does not appear to be any advantage in the presence of polycarbodiimides in said hydrocarbon rubber compounds or compositions.

EXAMPLE 4

The general procedure of Example 3, above, was repeated with the following rubber compounds or compositions using only the dipped and dried adhesive coated polyethylene terephthalate cord. The data and results obtained are shown in the Tables below:

TABLE II

| Rubber Compound | A' | B' | C' | D' |
|---|---|---|---|---|
| Natural rubber (1) | 35 | 35 | 35 | 35 |
| Chlorobutyl (4) | 65 | 65 | 65 | 65 |
| Carbon black (6) | 30 | 30 | 30 | 30 |
| Petroleum oil (10) | 7 | 7 | 7 | 7 |
| Resin (11) | 2 | 2 | 2 | 2 |
| Stearic acid | 2 | 2 | 2 | 2 |
| Zinc oxide | 5 | 5 | 5 | 5 |
| Sulfur | 1 | 1 | 1 | 1 |
| Di-o-tolyl guanidine | — | 1.5 | 1.5 | — |
| Polycarbodiimide (15) | — | — | 2 | 2 |

These compounds did not contain any butadienestyrene copolymer rubber and less carbon black than those of Example 3. As a result these compounds, particularly those which did not contain DOTG, were poorly cured and difficult to handle.

TABLE IIA

| Residual Tensile Strength of Dipped Cord | | | | |
|---|---|---|---|---|
| Rubber Compound | A' | B' | C' | D' |
| Residual tensile after molding, and after 3 days aging at 300° F. % | 86.6 | 58.4 | 79. | 75.6 |

It is seen that the deterioration of dipped polyethylene terephthalate tire cord in contact with cured chlorobutyl rubber composition in the presence of DOTG curing accelerator is considerable when aged for 3 days at 300° F. In the presence of 2 phr of polycarbodiimide the decrease in cord strength is minimized.

EXAMPLE 5

The general procedure of Example 3, above, was repeated with the following rubber compounds or compositions using du Pont T-68 polyethylene terephthalate tire cord, greige, having a tensile strength of 66–67 lbs. The data and results obtained are shown in the Tables below:

TABLE III

| Rubber Compound | A" | B" | C" |
|---|---|---|---|
| Chlorobutyl (4) | 50 | 50 | 50 |
| Bdn-Sty Copol. (5) | 15 | 15 | 15 |
| Natural rubber (1) | 35 | 35 | 35 |
| Carbon black (6) | 20 | 20 | 20 |
| Carbon black (7) | 60 | 60 | 60 |
| Stearic acid | 2 | 2 | 2 |
| Petroleum oil (10) | 7.5 | 7.5 | 7.5 |
| Resin (11) | 2 | 2 | 2 |
| Zinc oxide | 5 | 5 | 5 |
| Di-o-tolyl guanidine | 1.5 | 1.5 | 1.5 |
| Sulfur | 1 | 1 | 1 |
| Polycarbodiimide (16) | 0 | 2 | 4 |
| Cure 30 min./320° F. | | | |
| Shore A hardness | 58 | 58 | 58 |

TABLE IIIA

| Cord Residual Tensile Strength in % of Original Tensile | | | |
|---|---|---|---|
| Rubber Compound | A" | B" | C" |
| After aging 8 hrs/350° F. | 45 | 47 | 54 |
| After aging 24 hrs/350° F. | 25 | 38 | 36 |
| After aging 48 hrs/350° F. | 4.5 | 17 | 15 |

Additional experiments were conducted wherein du Pont T-68 greige polyester tire cord was cured in a chlorobutyl rubber-natural rubber-butadiene/styrene copolymer rubber tire innerliner composition and in a hydrocarbon rubber tire carcass composition and then aged at 250° F. and 350° F. for 2, 6 and 10 days and at 350° F. for 0, ½, 1 and 2 days. After aging, the cords were removed from the cured rubber-cord assemblies, and variations in cord tensile strength were determined. The cords aged in the carcass composition for 10 days at 250° F. dropped from 64 to 63 pounds while those aged in the innerline composition dropped from 62 to 55 pounds. After 10 days at 300° F., the cord from the carcass composition showed a strength of 57 pounds while the cord from the innerliner composition showed a strength of 37 pounds, and after 2 days at 350° F. the strengths were 44 and 5 pounds, respectively.

Since the tire innerliner composition caused damage to the polyethylene terephthalate tire cord under these static conditions, further tests were conducted. The tire innerliner composition was separated into a chlorobut compound part and a NR/SBR (natural rubber/butac ene-styrene rubbery copolymer) compound part. Tl PET tire cord was vulcanized with the chlorobut rubber containing zinc oxide, 2-mercaptobenzothiazo (MBT) and sulfur (3.8, 2 and 3 phr, respectively). Aft 2 days at 350° F. the tensile strength of the cord aged this compound dropped from 62 to 9 pounds indicatir severe damage due to the chlorobutyl rubber. The se ond part consisted of three compounds each having phr of NR and 30 phr of SBR. The first was vulcanize with MBT and sulfur (2 and 3 phr, respectively); tl second was vulcanized with sulfenamide and sulfur and 2 phr, respectively); and the third was vulcanize with DOTG and sulfur (3 and 2 phr, respectively). Tl cord tensile strengths after aging in these three latte compounds were 31, 29 and 10 pounds, respectivel indicating that the DOTG also causes severe damage the NR/SBR part of the tire innerliner compound composition. The chlorobutyl rubber/NR/SBR tii innerliner compound therefor has two severely damaς ing ingredients, e.g., chlorobutyl and DOTG at tl level used in the test. It, thus, would appear that tl polyimino compound and the halobutyl rubber or the curing fragments or decomposition products adversel affect the strength of the polyester cord probably b causing hydrolysis, ammonolysis, chain scission and s forth.

NOTES:
(1)—Masticated, peptized No. 3 ribbed smoked she natural rubber,
(2)—Solution polymerized rubber about 93% cis, ra\ Mooney ML-4 et 212° F. of 40–50.
(3)—SBR-1778 rubber. Butadiene-styrene copolɟ mer. About 23.5% bound styrene. Cold emulsio polymerized. Oil masterbatch. Contains about 37. phr naphthenic oil. Nominal Mooney viscosity M] 1+4 at 212° F. of 55, non-staining.
(4)—"Exxon" chlorobutyl rubber, HT-1068. Unsatι ration 1.1–1.7 mol %. Mooney viscosity ML 1+ 212° F. 50–60 (1+3) (260° F.). 1.1–1.3 wt. % chlc rine. Non-staining stabilizer.
(5)—SBR-1502 rubber. Butadiene-styrene copolɟ mer. About 23.5% bound styrene. Cold emulsio polymerized. Nominal Mooney viscosity ML 1+ at 212° F. of 52. Non-staining.
(6)—High abrasion furnace low structure.
(7)—Medium thermal non-staining.
(8)—High abrasion furnace high structure.
(9)—Fast extruding furnace.
(10)—Naphthenic rubber processing and extender oi ASTM D-2226-69 Type 103. "Circosol" 42XF Sun Oil Company.
(11)—Phenol-formaldehyde type resin. Tackifiει Rohm & Haas Co. "Amberol" ST-137X.
(12)—Petroleum hydrocarbon resins, polymers c aliphatic olefins. Plasticizer, softener and tackifiει Harwick Standard Chemical Co. "Piccopale" 10 resin.
(13)—Styrenated phenol.
(14)—"Crystex." Stauffer Chemical Co.
(15)—"PCD," antioxidant. Farbenfabriken Baye A.G.
(16)—Low m.w. polycarbodiimide made by proces of Example 1, above, using tolylene diisocyanat and methanol. It had a molecular weight of aboι

680, was 85% active polycarbodiimide, and had an average carbodiimide content of 15.62%.

"Exxon," "Exxon Chemicals," Exxon Corp.

The embodiments of the invention in which an exclusive property or privilege is claimed are defined as follows:

1. A composition comprising 100 parts by weight of a halogen containing butyl rubber selected from the group consisting of bromobutyl rubber and chlorobutyl rubber and mixtures thereof and from about 1.5 to 25 parts by weight of a polycarbodiimide.

2. A composition according to claim 1 containing additionally a highly unsaturated hydrocarbon rubber in an amount of from about 15 to 110 parts by weight and a sulfur curing system in an amount sufficient to cure the composition including a polyimino compound in an amount sufficient to accelerate the cure of said composition.

3. A composition according to claim 2 in which said polycarbodiimide is used in an amount of from about 2 to 12 parts by weight.

4. A cured composition comprising 100 parts by weight of a halogen containing butyl rubber selected from the group consisting of bromobutyl rubber and chlorobutyl rubber and mixtures thereof and from about 1.5 to 25 parts by weight of a polycarbodiimide.

5. A composition of matter comprising 100 parts by weight of chlorobutyl rubber, from about 2 to 12 parts by weight of a polycarbodiimide, from about 15 to 110 parts by weight of a highly unsaturated hydrocarbon rubber selected from the group consisting of natural rubber and a mixture of natural rubber and a rubbery butadiene-1,3/styrene copolymer, and a sulfur curing system in an amount sufficient to cure the composition including di-o-tolyl guanidine in an amount sufficient to accelerate the cure of the composition.

6. A cured composition comprising 100 parts by weight of a halogen containing butyl rubber selected from the group consisting of bromobutyl rubber and chlorobutyl rubber and mixtures thereof, from about 1.5 to 25 parts by weight of a polycarbodiimide, and from about 15 to 110 parts by weight of a highly unsaturated hydrocarbon rubber, said composition having been cured with a sulfur curing system in an amount sufficient to cure said composition and including a polyimino compound in an amount sufficient to accelerate the cure of said composition.

7. A cured composition according to claim 6 in which said polycarbodiimide is used in an amount of from about 2 to 12 parts by weight.

8. A cured composition according to claim 7 in which said halogen containing butyl rubber is chlorobutyl rubber, said hydrocarbon rubber is selected from the group consisting of natural rubber and a mixture of natural rubber and a rubbery butadiene-1,3/styrene copolymer, and said polyimino compound is di-o-tolyl guanidine.

9. A flexible, cured laminate comprising,
   (1) a first layer of a composition comprising 100 parts by weight of a halogen containing butyl rubber selected from the group consisting of bromobutyl rubber and chlorobutyl rubber and mixtures thereof and from about 1.5 to 25 parts by weight of a polycarbodiimide and,
   (2) a second layer adherent to said first layer and comprising a hydrocarbon rubber composition containing a plurality, of polyester cords adhesively bound to the hydrocarbon rubber of said composition.

10. A laminate according to claim 9 in which both layers have been cured with a sulfur curing system in an amount sufficient to cure the compositions of said layers, said first named layer containing additionally a highly unsaturated hydrocarbon rubber in an amount of from about 15 to 110 parts by weight and including a polyimino compound in an amount sufficient to accelerate the cure of said composition of said first layer.

11. A laminate according to claim 10 in which said polycarbodiimide is used in an amount of from about 2 to 12 parts by weight.

12. A laminate according to claim 11 in which said halogen containing butyl rubber is chlorobutyl rubber, said hydrocarbon in said first layer is selected from the group consisting of natural rubber and mixtures of natural rubber and a rubbery butadiene-1,3/styrene copolymer, said polyimino compound is di-o-tolyl guanidine, and said polyester is polyethylene terephthalate.

* * * * *